Patented June 28, 1949

2,474,309

UNITED STATES PATENT OFFICE 2,474,309

WEATHER RESISTANT COMPOSITION

Philip Tucker Gidley, Fairhaven, Mass., assignor, by mesne assignments, to Standard Oil Development Company, a corporation of Delaware No Drawing. Application November 8, 1944, Serial No. 562,571

3 Claims. (Cl. 260—23.7)

This invention relates to a new weather resistant composition suitable for a wide variety of uses. More particularly, this invention relates to a novel elastic composition which can be processed and fabricated with conventional rubber manufacturing equipment.

An object of this invention is to produce a new composition of matter unusually resistant to sunlight and outdoor weather exposure. Another object is to provide an elastic material for treating cloth which will be resistant to sunlight and at the same time will not crack on flexing at low temperatures. A further object is a new material which will process readily without the necessity of excessive temperatures during mixing or preparation on a mill or in a Banbury mixer. Still another object is a composition very resistant to oils and fats. Another object is a composition resistant to ozone, corona effect, and electrical current. A further object is to advance the prior art. Other objects will appear hereinafter.

My invention consists essentially of intimately associating a rubbery butadiene acrylonitrile copolymer and a polyvinyl acetate resin.

The butadiene acrylic acid nitrile copolymer which I prefer is one containing 74% of butadiene and 26% of acrylic acid nitrile; however, any copolymer of butadiene and acrylic acid nitrile regardless of the relative proportions is intended in the scope of my invention. As the polyvinyl acetate resins employed in my inventions are polymerized vinyl acetate $(CH_3COOCHCH_2)_x$, and any resin or substance which is a copolymer of vinyl acetate regardless of the relative proportions of the vinyl acetate and the copolymerizing substance. I prefer in this invention a copolymer resin formed by reacting 99 to 15% vinyl acetate with 1 to 85% of a copolymerizing substance. However desirable and novel results can be obtained with copolymers consisting of as little as 5% of vinyl acetate. For example, the copolymer of 5 parts of vinyl acetate and 95 parts of vinyl alcohol.

The following examples will serve to illustrate my invention.

EXAMPLE 1

100 parts of polyvinyl acetate resin having a softening point of approximately 44° centigrade was added on the form of a powder to 100 parts of butadiene acrylonitrile copolymer on very tight mill rolls at about 200° Fahrenheit. The mix was milled until intimate homogeneous association was obtained and the following materials added: 40 parts of carbon black; 20 parts of dioctyl phthalate; 30 parts of tricresyl phosphate; 10 parts of dibenzyl sebacate; 8 parts of zinc oxide; 2 parts of sulfur; 1.5 parts of benzothiazyl disulfide; 1.5 parts of phenyl betanaphthylamine; 1.5 parts of paraffin wax; and 1.5 parts of stearic acid.

The resultant mixture was milled till all materials were homogeneously dispersed and then vulcanized for 60 minutes at 305° Fahrenheit under pressure with results as enumerated in Table 1.

Table 1

| | |
|---|---|
| Tensile strength | 2405 lbs. per sq. in. |
| Ultimate elongation | 480% |
| Low temperature flexibility | −78° Fahrenheit |
| Sunlight exposure (3 weeks) | No cracks |
| Oil exposure (3 weeks at 70° Fahrenheit) | No change |

The sunlight exposure was conducted with strips under a static tension of 15% elongation. A control strip composed entirely of a butadiene acrylonitrile copolymer compound showed cracking in 9 days.

EXAMPLE 2

100 parts of a vinyl acetate resin substantially a copolymer of vinyl acetate and vinyl chloride were intimately mixed by adding to 100 parts of butadiene acrylonitrile copolymer on a conventional rubber mill at approximately 160° Fahrenheit. After milling for 12 minutes, the batch was removed and remilled on tight mill rolls the following day at approximately 230° Fahrenheit until homogeneity was obtained. Then the following ingredients were added: 60 parts of channel black; 55 parts of tricresyl phosphate; 20 parts of dicapryl phthalate; 2 parts of sulfur; 10 parts of zinc oxide; 2 parts of stearic acid; 2 parts of hard petroleum wax; 2 parts of mercaptobenzythiazole; and 1 part of phenyl beta naphthyl amine.

The resultant mixture was vulcanized 60 minutes at 305° Fahrenheit with results as illustrated in Table 2.

Table 2

| | |
|---|---|
| Tensile strength | 3110 lbs. per sq. in. |
| Ultimate elongation | 565% |
| Low temperature flexibility | −75° Fahrenheit |
| Sunlight exposure (3 weeks) | No cracks |

The sunlight exposure was conducted in the same manner as the sunlight exposure shown in Table 1.

Oil exposure (3 weeks at 70° F.) _____ No change
Water absorption (1 weeks at 70° F.) __ 0.12%

It is obvious to those skilled in the art that other ingredients may be added to the acetate-butadiene nitrile composition instead of the ingredients used in the two examples above. Among the ingredients which may be employed with my new acetate-butadiene nitrile mix are the following (not intended to be limitative):

| | |
|---|---|
| Animal fatty acids | Asbestos |
| Antimony sulfide | Barium carbonate |
| Cottonseed fatty acid | Barytes |
| Fish oil acid, hydrogenated | Bentonite |
| | Blanc fixe |
| Hydrated lime | Calcium silicate |
| Lauric acid | Chalk |
| Litharge | Gypsum |
| Lead silicate | Diatomaceous earth |
| Magnesia | Bone glue |
| Oleic acid | Graphite |
| Palm oil fatty acid | Lignin |
| Clay | Magnesium carbonate |
| Cotton flock | Magnesium silicate |
| Sodium laurate | Pumice |
| Whiting | Silica |
| Zinc stearate | Slate |
| Zinc palmitate | Talc |
| Zinc oleate | Wood flour |
| Paraffin | Zinc carbonate |
| Petroleum waxes | Calcined carbon |
| Sodium bicarbonate | Carbon oxides |
| Factice | Shellac |
| Zinc sulfide | Zein |
| Titanium dioxide | Soya bean oil |
| Organic colors | Beeswax |
| Chrome oxides | Pitch |
| Lead chromate | Pine tar |
| Cadmium sulfide | Pine oil |
| Ultramarine blue | Castor oil |
| Cadmium salts | Coal tar oils |
| Calcium stearate | Cocoanut oil fatty acid |
| Iron oxide | Wool grease |
| Lithol toners | Dialkyl phthalates |
| Cumar-indene resins | Dialkyl sebacates |
| Coumarone resins | Diaryl phthalates |
| Granulated cork | Dialkyl sebacates |
| Mineral rubber | Trialkyl (or aryl) phosphates |
| Gilsonite | |
| Asphalt | Alkyl propionates |
| Sulfurized oils | Fat acids |
| Oxidized oils | Natural waxes |
| Kaolin | Rosin oil |
| Mica | Tar oil |
| Aluminum silicate | Vulcanized oils |

I claim:

1. A vulcanized composition of matter characterized by superior sunlight resistance and ultimate elongation of at least 480 percent and a tensile strength of at least 2405 pounds per square inch, said composition consisting of: 100 parts of a rubbery butadiene-acrylonitrile copolymer mixed homogeneously with a substantially equal amount of a polyvinyl acetate resin having a softening point of approximately 44° C.; 40 parts of carbon black; 20 parts of dioctyl phthalate; 30 parts of tricresyl phosphate; 10 parts of dibenzyl sebacate; 8 parts of zinc oxide; 2 parts of sulfur; 1.5 parts of benzothiazyl disulfide; 1.5 parts of phenyl beta naphthylamine; 1.5 parts of paraffin wax and 1.5 parts of stearic acid.

2. A vulcanized composition of matter characterized by superior sunlight resistance and ultimate elongation of at least 480% and a tensile strength of at least 2405 pounds per square inch, said composition consisting of: 100 parts of a rubbery butadiene-acrylonitrile copolymer, mixed homogeneously with a substantially equal amount of a resinous polymer of vinyl acetate; 40 parts of carbon black; 20 parts of dioctyl phthalate; 30 parts of tricresyl phosphate; 10 parts of dibenzyl sebacate; 8 parts of zinc oxide; 2 parts of sulfur; 1.5 parts of benzothiazyl disulfide; 1.5 parts of phenyl beta naphthylamine; 1.5 parts of paraffin wax; 1.5 parts of stearic acid.

3. A vulcanized composition of matter characterized by superior sunlight resistance and ultimate elongation of at least 480% and a tensile strength of at least 2405 pounds per square inch, said composition consisting of: 100 parts of a rubbery butadiene-acrylonitrile copolymer mixed homogeneously with a substantially equal amount of a resinous copolymer of 5 parts of vinyl acetate and 95 parts of vinyl alcohol; 40 parts of carbon black; 20 parts of dioctyl phthalate; 30 parts of tricresyl phosphate; 10 parts of dibenzyl sebacate; 8 parts of zinc oxide; 2 parts of sulfur; 1.5 parts of benzothiazyl disulfide; 1.5 parts of phenyl beta naphthylamine; 1.5 parts of paraffin wax; 1.5 parts of stearic acid.

PHILIP TUCKER GIDLEY.

REFERENCES CITED

The following references are of record in the file of this patent:

UNITED STATES PATENTS

| Number | Name | Date |
|---|---|---|
| 2,277,259 | Schnabel | Mar. 24, 1942 |
| 2,323,562 | Nugent | July 6, 1943 |
| 2,330,353 | Henderson | Sept. 28, 1943 |
| 2,341,398 | Strother | Feb. 8, 1944 |
| 2,376,854 | Saunders | May 22, 1945 |
| 2,383,789 | Harvey | Aug. 28, 1945 |
| 2,409,276 | Harvey | Oct. 15, 1946 |
| 2,412,216 | Harvey | Dec. 10, 1946 |